Aug. 21, 1928.

R. ROSSI

SLED

Filed Oct. 12, 1926

1,681,686

Ruggiero Rossi
INVENTOR

Patented Aug. 21, 1928.

1,681,686

UNITED STATES PATENT OFFICE.

RUGGIERO ROSSI, OF ELLWOOD CITY, PENNSYLVANIA.

SLED.

Application filed October 12, 1926. Serial No. 141,064.

The invention consists of improvements of a sled. A seat, a foot-rest and a steering device, are provided in conjunction with the runners. The object of these improvements is, first, to provide comfort for the rider by means of a seat and foot-rest; second, to facilitate control of the sled by means of a steering device; third, to lighten the handling of the sled by providing handles in the foot-rest and in the back of the seat.

Figure 2:
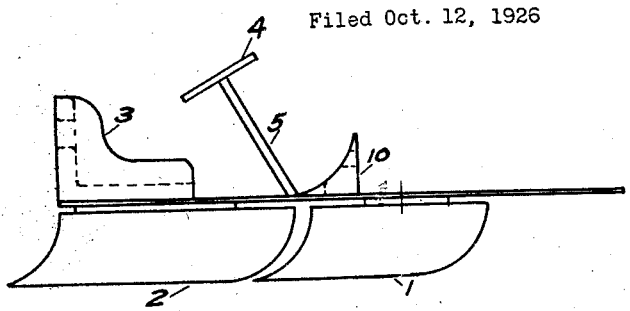
Figure 1:
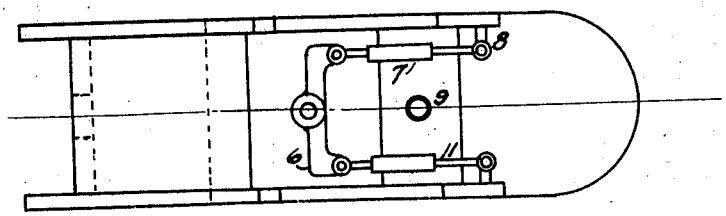
Figure 3:
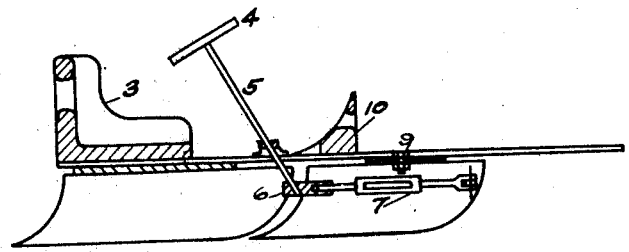

One form of my sled-improvements is illustrated by the accompanying drawing of which Fig. 1 is a plan, Fig. 2 a side elevation and Fig. 3 a section. A clearance between sleds 1 and 2 is provided to allow a limited movement of sled 1, the face of sled 2 acting as a stop. 3 is a seat with a handhold provided for lifting the sled. 4 is a steering wheel; 5 a steering rod; 6 is a yoke; 7 a turnbuckle and 8 an eyebolt. 9 is a king pin; 10 is a foot-rest, in which a handle is provided to facilitate handling.

I claim:

In a sled, a seat, a pair of rear runners rigidly connected thereto and provided with forwardly and upwardly curved front ends, a board pivotally connected to the seat in advance of the rear runners, runners rigidly connected to the board and provided with downwardly and backwardly curved rear ends, the front runners being spaced from the rear runners sufficiently to permit steering, the rear face of the front runners being adapted to contact with the front face of the rear runners to prevent wide-angle steering, and means for steering the front runners.

RUGGIERO ROSSI.